United States Patent
Mier et al.

(10) Patent No.: US 8,075,830 B2
(45) Date of Patent: Dec. 13, 2011

(54) POLYPROPYLENE BLOWN FILM

(75) Inventors: Rodolfo Mier, Pasadena, TX (US);
Mark Miller, Houston, TX (US);
Raleigh McBride, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 118 days.

(21) Appl. No.: 11/956,406

(22) Filed: Dec. 14, 2007

(65) Prior Publication Data
US 2008/0146762 A1    Jun. 19, 2008

Related U.S. Application Data

(60) Provisional application No. 60/875,204, filed on Dec. 15, 2006.

(51) Int. Cl.
C08F 110/06 (2006.01)

(52) U.S. Cl. ........ 264/514; 526/351; 526/352; 428/515; 428/516; 428/523; 264/165; 264/209.3; 264/209.4; 264/211.13; 264/510; 264/515; 264/572; 528/502 R

(58) Field of Classification Search ........ 526/351, 526/352; 428/515, 516, 523; 264/165, 209.3, 264/209.4, 211.13, 510, 514, 515, 572; 528/502 R
See application file for complete search history.

(56) References Cited

U.S. PATENT DOCUMENTS

| | | | |
|---|---|---|---|
| 4,115,048 A * | 9/1978 | Alderfer et al. ............. 425/72.1 |
| 4,271,060 A | 6/1981 | Hubby | |
| 4,298,718 A | 11/1981 | Mayr et al. | |
| 4,330,501 A * | 5/1982 | Jones et al. ................... 264/566 |
| 4,532,189 A * | 7/1985 | Mueller ......................... 428/516 |
| 4,543,399 A | 9/1985 | Jenkins, III et al. | |
| 4,544,717 A | 10/1985 | Mayr et al. | |
| 4,588,790 A | 5/1986 | Jenkins, III et al. | |
| 4,767,735 A | 8/1988 | Ewen et al. | |
| 4,820,471 A * | 4/1989 | van der Molen ............. 264/564 |
| 5,001,205 A | 3/1991 | Hoel | |
| 5,028,670 A | 7/1991 | Chinh et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |

(Continued)

FOREIGN PATENT DOCUMENTS

WO    WO 9841571 A1 *    9/1998

(Continued)

OTHER PUBLICATIONS

Ciba, Inc., PP Bottles & Containers, Nov. 18, 2004.*

*Primary Examiner* — Vasu Jagannathan
*Assistant Examiner* — Richard A Huhn

(57) ABSTRACT

A blown film that comprises polypropylene that has a melt flow rate of 1.8 to 14.0 g/10 min. and a melting point of at least 115° C. The blown film has a haze of less than 10% and a gloss of greater than 70%. The blown film may be co-extruded with a medium density polyethylene or 15 wt % of an impact copolymer. A clarifier may also be incorporated. The blown film that comprises polypropylene is produced on a standard air cooled blown film line.

12 Claims, 2 Drawing Sheets

U.S. PATENT DOCUMENTS

| | | | |
|---|---|---|---|
| 5,462,999 | A | 10/1995 | Griffin et al. |
| 5,472,791 | A * | 12/1995 | Landoni ................. 428/516 |
| 5,525,678 | A | 6/1996 | Mink et al. |
| 5,589,555 | A | 12/1996 | Zboril et al. |
| 5,614,297 | A * | 3/1997 | Velazquez .............. 428/212 |
| 5,616,661 | A | 4/1997 | Eisinger et al. |
| 5,627,242 | A | 5/1997 | Jacobsen et al. |
| 5,643,847 | A | 7/1997 | Walzer, Jr. |
| 5,665,818 | A | 9/1997 | Tilston et al. |
| 5,668,228 | A | 9/1997 | Chinh et al. |
| 5,677,375 | A | 10/1997 | Rifi et al. |
| 5,681,523 | A * | 10/1997 | Cobler et al. ............. 264/565 |
| 5,942,256 | A * | 8/1999 | Pottorff ................. 425/72.1 |
| 5,945,366 | A | 8/1999 | Kataoka et al. |
| 6,143,686 | A | 11/2000 | Vizzini et al. |
| 6,147,173 | A | 11/2000 | Holtcamp |
| 6,180,735 | B1 | 1/2001 | Wenzel |
| 6,207,606 | B1 | 3/2001 | Lue et al. |
| 6,211,105 | B1 | 4/2001 | Holtcamp |
| 6,228,795 | B1 | 5/2001 | Vizzini |
| 6,242,545 | B1 | 6/2001 | Jejelowo et al. |
| 6,245,705 | B1 | 6/2001 | Kissin |
| 6,245,857 | B1 * | 6/2001 | Shamshoum et al. ........ 525/240 |
| 6,245,868 | B1 | 6/2001 | Agapiou et al. |
| 6,248,845 | B1 | 6/2001 | Loveday et al. |
| 6,271,323 | B1 | 8/2001 | Loveday et al. |
| 6,274,684 | B1 | 8/2001 | Loveday et al. |
| 6,300,436 | B1 | 10/2001 | Agapiou et al. |
| 6,339,134 | B1 | 1/2002 | Crowther et al. |
| 6,340,730 | B1 | 1/2002 | Murray et al. |
| 6,346,586 | B1 | 2/2002 | Agapiou et al. |
| 6,359,072 | B1 | 3/2002 | Whaley |
| 6,380,328 | B1 | 4/2002 | McConville et al. |
| 8,399,837 | | 6/2002 | Wilson at al. |
| 6,420,580 | B1 | 7/2002 | Holtcamp et al. |
| 6,495,266 | B1 * | 12/2002 | Migliorini ................ 428/461 |
| 7,217,767 | B2 | 5/2007 | Aguirre et al. |
| 2001/0039314 | A1 * | 11/2001 | Mehta et al. .............. 525/240 |
| 2002/0006482 | A1 * | 1/2002 | Falla et al. ............... 428/35.2 |
| 2002/0156193 | A1 * | 10/2002 | Tau et al. ................ 525/191 |
| 2004/0082750 | A1 * | 4/2004 | Tau et al. ................ 526/348.1 |
| 2006/0004167 | A1 | 1/2006 | Tau et al. |
| 2006/0147663 | A1 | 7/2006 | Barre et al. |
| 2006/0199884 | A1 | 9/2006 | Hoenig et al. |

FOREIGN PATENT DOCUMENTS

WO    WO 2005035598 A1 * 4/2005

* cited by examiner

Gloss and Haze Values of Blown Structures

Gloss and Haze Values of Blown Structures

Secant Modulus of Blown Structures

Tear and Dart Impact Resistance

POLYPROPYLENE BLOWN FILM

FIELD

This invention relates to polypropylene and more particularly to polypropylene that is predominantly useful for preparing blown films.

BACKGROUND

The film market demands polypropylene resins that can produce a special combination of film properties. Typically high clarity, high gloss polypropylene films can be produced by cast, double bubble (tubular), and water quenched blown film processes. Excellent optical film properties can also be obtained through biaxial orientation (BOPP) by the tenderframe process. An air-cooled blown film process, which is widely used to produce polyethylene film, does not produce high clarity films using conventional polypropylene resins.

Achieving high clarity, high gloss blown films made from polypropylene using existing processing technology is desirable. Producing a blown film with a high modulus is also desirable.

SUMMARY

In one embodiment, the present invention includes a blown film comprising polypropylene, said polypropylene having a melt flow rate of 1.8 g/10 min. to 14.0 g/10 min. and a melting point of at least 115° C., wherein said blown film has a haze of less than 10% and a gloss of greater than 70%.

In one embodiment, the present invention includes an article of manufacture, wherein said article of manufacture is overwraps for retail clothing, specialty bakery films, fresh cut produce pouches, vertical form fill and seal packaging for grains (such as rice and beans), heat resistant films, sealant webs, low abuse frozen food films, or as a small component in shrink films.

In one embodiment, the present invention includes a process of forming a blown film comprising polypropylene having a melt flow rate of 1.8 g/10 min. to 14.0 g/10 min. and a melting point of at least 115° C., wherein said blown film has a haze of less than 10% and a gloss of greater than 70%, wherein said process comprises quenching said blown film with air at a temperature less than 10° C., and wherein said process further comprises internal bubble cooling, external bubble stabilizers, and a dual lip air ring.

DETAILED DESCRIPTION

Introduction and Definitions

Figure 1:
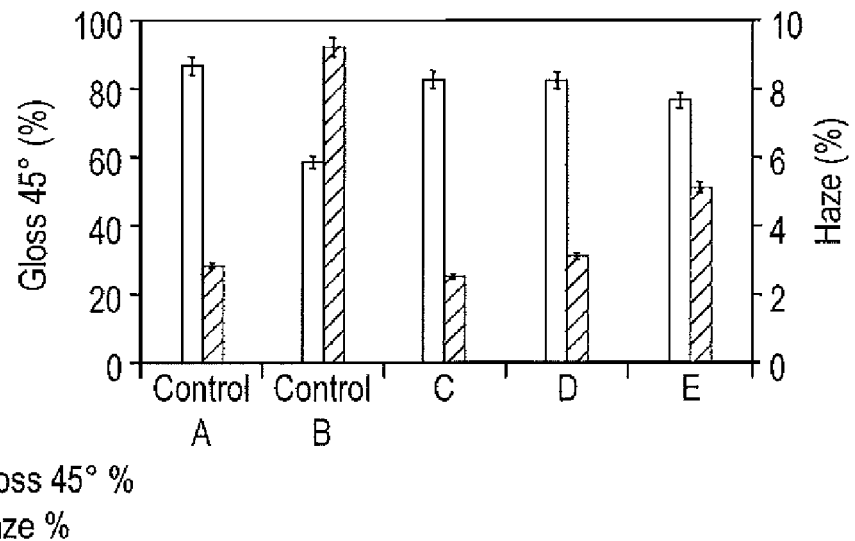
FIG. 1 illustrates the gloss and haze values of blown structures made from clarified polymers.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Certain polymerization processes disclosed herein involve contacting polyolefin monomers with one or more catalyst systems to form a polymer.

Catalyst Systems

The catalyst systems used herein may be characterized as supported catalyst systems or as unsupported catalyst systems, sometimes referred to as homogeneous catalysts. The catalyst systems may be metallocene catalyst systems, Ziegler-Natta catalyst systems or other catalyst systems known to one skilled in the art for the production of polyolefins, for example. A brief discussion of such catalyst systems is included below, but is in no way intended to limit the scope of the invention to such catalysts.

A. Ziegler-Natta Catalyst System

Ziegler-Natta catalyst systems are generally formed from the combination of a metal component (e.g., a catalyst precursor) with one or more additional components, such as a catalyst support, a cocatalyst and/or one or more electron donors.

A specific example of a catalyst precursor is a metal component generally represented by the formula:

$$MR_x;$$

where M is a transition metal, R is a halogen, an alkoxy, or a hydrocarboxyl group and x is the valence of the transition metal. For example, x may be from 1 to 4. The transition metal of the Ziegler-Natta catalyst compound, as described throughout the specification and claims, may be selected from Groups IV through VIB in one embodiment and selected from titanium, chromium, or vanadium in a more particular embodiment. R may be selected from chlorine, bromine, carbonate, ester, or an alkoxy group in one embodiment. Examples of catalyst precursors include, but are not limited to, $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

Those skilled in the art will recognize that a catalyst precursor is "activated" in some way before it is useful for promoting polymerization catalyst. As discussed further below, activation may be accomplished by combining the catalyst precursor with an activator, which is also referred to in some instances as a "cocatalyst." As used herein, the term "Z-N activator" refers to any compound or combination of compounds, supported or unsupported, which may activate a Z-N catalyst precursor. Embodiments of such activators include, but are not limited to, organoaluminum compounds, such as trimethyl aluminum (TMA), triethyl aluminum (TEAl) and triisobutyl aluminum (TiBAl), for example.

The Ziegler-Natta catalyst system may further include one or more electron donors to enhance stereoselectivity, such as internal electron donors and/or external electron donors.

Internal electron donors may be used to reduce the atactic form of the resulting polymer, thus decreasing the amount of xylene solubles in the polymer. A polymer is "atactic" when its pendant groups are arranged in a random fashion on both sides of the chain of the polymer (low stereoselectivity). In contrast, a polymer is "isotactic" when all of its pendant groups are arranged on the same side of the chain and "syndiotactic" when its pendant groups alternate on opposite sides of the chain (both are examples of high stereoselectivity). The internal electron donors may include amines, amides, esters, ketones, nitrites, ethers and phosphines in one embodiment. The internal electron donors include, but are not limited to, diethers, succinates and thalates, such as those described in U.S. Pat. No. 5,945,366, which is incorporated by reference herein, in a more particular embodiment. The internal electron donors include dialkoxybenzenes, such as those described in U.S. Pat. No. 6,399,837, which is incorporated by reference herein, in another embodiment.

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS). The external donor may be the same or different from the internal electron donor used.

The components of the Ziegler-Natta catalyst system (e.g., catalyst precursor, activator and/or electron donors) may or may not be associated with a support, either in combination with each other or separate from one another. Typical support materials may include a magnesium dihalide, such as magnesium dichloride or magnesium dibromide, for example.

Ziegler-Natta catalyst systems and processes for forming such catalyst systems are described in at least U.S. Pat. No. 4,298,718, U.S. Pat. No. 4,544,717 and U.S. Pat. No. 4,767,735, which are incorporated by reference herein.

B. Metallocene Catalyst System

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment, selected from Groups 3 through 10 atoms in a more particular embodiment, selected from Sc, Ti, Zr, Hf, V, Nb, Ta, Mn, Re, Fe, Ru, Os, Co, Rh, Ir, and Ni in yet a more particular embodiment, selected from Groups 4, 5 and 6 atoms in yet a more particular embodiment, Ti, Zr, Hf atoms in yet a more particular embodiment and Zr in yet a more particular embodiment. The oxidation state of the metal atom "M" may range from 0 to +7 in one embodiment, in a more particular embodiment, is +1, +2, +3, +4 or +5 and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Cp typically includes fused ring(s) or ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include 2-methyl, 4phenyl indenyl; cyclopentadienyl; cyclopentaphenanthreneyl; indenyl; benzindenyl; fluorenyl; tetrahydroindenyl; octahydrofluorenyl; cyclooctatetraenyl; cyclopentacyclododecene; phenanthrindenyl; 3,4-benzofluorenyl; 9-phenylfluorenyl; 8-H-cyclopent[a]acenaphthylenyl; 7-H-dibenzofluorenyl; indeno[1,2-9]anthrene; thiophenoindenyl; thiophenofluorenyl; hydrogenated versions thereof (e.g., 4,5,6,7-tetrahydroindenyl or $H_4Ind$); substituted versions thereof and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl and the like. Other possible radicals include substituted alkyls and aryls such as, for example, fluoromethyl, fluroethyl, difluoroethyl, iodopropyl, bromohexyl, chlorobenzyl and hydrocarbyl substituted organometalloid radicals including trimethylsilyl, trimethylgermyl, methyldiethylsityl and the like, halocarbyl-substituted organometalloid radicals including tris(trifluoromethyl)silyl, methylbis(difluoromethyl)silyl, bromomethyldimethylgermyl and the like, disubstituted boron radicals including dimethylboron for example, disubstituted Group 15 radicals including dimethylamine, dimethylphosphine, diphenylamine, methylphenylphosphine and Group 16 radicals including methoxy, ethoxy, propoxy, phenoxy, methylsulfide and ethylsulfide. Other substituents R include olefins, such as but not limited to, olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from carbon, nitrogen, oxygen, phosphorous, silicon, germanium, aluminum, boron and combinations thereof. Also, a substituent group R group such as 1-butanyl, may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, $C_1$ to $C_{12}$ heteroatom-containing hydrocarbons and substituted derivatives thereof, hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls and $C_7$ to $C_{18}$ fluoroalkylaryls in yet a more particular embodiment, hydride, chloride, fluoride, methyl, phenyl, phenoxy, benzoxy, tosyl, fluoromethyls and fluorophenyls in yet a more particular embodiment, $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls, $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment, chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls and halogenated $C_7$ to $C_{18}$ alkylaryls in yet a more particular embodiment, fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. A bridged metallocene, for example may, be described by the general formula:

$$XCp^A Cp^B MA_n;$$

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to, at least one of a carbon, oxygen, nitrogen, silicon, aluminum, boron, germanium, tin and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging groups are represented by $C_1$ to $C_6$ alkylenes, substituted $C_1$ to $C_6$ alkylenes, oxygen, sulfur, $R_2C=$, $R_2Si=$, —$Si(R)_2Si(R_2)$— and $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms and halogen radicals and wherein two or more Rs may be joined to form a ring or ring system. In one embodiment, the bridged metallocene catalyst component has two or more bridging groups (X).

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO") and alkylaluminum compounds as activators, to activate desirable metallocenes described herein. MAO and other aluminum-based activators are well known in the al. Non-limiting examples of aluminum alkyl compounds which may be utilized as activators for the catalysts described herein include trimethylaluminum, triethylaluminum, triisobutylaluminum, tri-n-hexylaluminum, tri-n-octylaluminum and the like.

Ionizing activators are well known in the art and are described by, for example, Eugene Yozi-Xian Chen & Tobin J. Marks, *Cocatalysts for Metal-Catalyzed Olefin Polymerization: Activators, Activation Processes; and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms, aryl groups having 3 to 20 carbon atoms (including substituted aryls) and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include, but are not limited to, silica, alumina, magnesia, titania and zirconia, for example. The inorganic oxides used as support materials may have an average particle size of from 30 microns to 600 microns or from 30 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2 cc/g. Desirable methods for supporting metallocene ionic catalysts are described in U.S. Pat. Nos. 5,643,847; 09,184,358 and 09,184,389, which are incorporated by reference herein.

Polymerization Processes

As indicated elsewhere herein, catalyst systems are used to make polyolefin compositions. Once the catalyst system is prepared, as described above and/or as known to one skilled in the art, a variety of processes can be carried out using that composition. Among the varying approaches that can be used include procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes of U.S. Pat. No. 6,420,580, U.S. Pat. No. 6,380,328, U.S. Pat. No. 6,359,072, U.S. Pat. No. 6,346,586, U.S. Pat. No. 6,340,730, U.S. Pat. No. 6,339,134, U.S. Pat. No. 6,300,436, U.S. Pat. No. 6,274,684, U.S. Pat. No. 6,271,323, U.S. Pat. No. 6,248,845, U.S. Pat. No. 6,245,868, U.S. Pat. No. 6,245,705, U.S. Pat. No. 6,242,545, U.S. Pat. No. 6,211,105, U.S. Pat. No. 6,207,606, U.S. Pat. No. 6,180,735 and U.S. Pat. No. 6,147,173 may be used and are incorporated by reference herein.

The catalyst systems described above can be used in a variety of polymerization processes, over a wide range of temperatures and pressures. The temperatures may be in the range of from about −60° C. to about 280° C., or from about 50° C. to about 200° C. and the pressures employed may be in the range of from 1 atmosphere to about 500 atmospheres or higher.

Polymerization processes may include solution, gas phase, slurry phase, high pressure processes or a combination thereof.

In certain embodiments, the process of the invention is directed toward a solution, high pressure, slurry or gas phase polymerization process of one or more olefin monomers having from 2 to 30 carbon atoms, or from 2 to 12 carbon atoms or from 2 to 8 carbon atoms, such as ethylene, propylene, butane, pentene, methylpentene, hexane, octane and decane. Other monomers include ethylenically unsaturated monomers, diolefins having from 4 to 18 carbon atoms, conjugated or nonconjugated dienes, polyenes, vinyl monomers and cyclic olefins. Non-limiting monomers may include norbornene, nobornadiene, isobutylene, isoprene, vinylbenzocyclobutane, sytrnes, alkyl substituted styrene, ethylidene norbornene, dicyclopentadiene, and cyclopentene. In one embodiment, a copolymer is produced, such as propylene/ethylene, or a terpolymer is produced. Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. No. 4,543,399, U.S. Pat. No. 4,588,790, U.S. Pat. No. 5,028,670, U.S. Pat. No. 5,317,036, U.S. Pat. No. 5,352,749, U.S. Pat. No. 5,405,922, U.S. Pat. No. 5,436,304, U.S. Pat. No. 5,456,471, U.S. Pat. No. 5,462,999, U.S. Pat. No. 5,616,661 and U.S. Pat. No. 5,668,228, which are incorporated by reference herein.)

The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C. Other gas phase processes contemplated by the process includes those described in U.S. Pat. No. 5,627,242, U.S. Pat. No. 5,665,818 and U.S. Pat. No. 5,677,375, which are incorporated by reference herein.

Slurry processes generally include forming a suspension of solid, particulate polymer in a liquid polymerization medium, to which monomers and optionally hydrogen, along with catalyst, are added. The suspension (which may include diluents) can be intermittently or continuously removed from the reactor where the volatile components can be separated from the polymer and recycled, optionally after a distillation, to the reactor. The liquefied diluent employed in the polymerization medium is typically an alkane having from 3 to 7 carbon atoms, such as a branched alkane. The medium employed is generally liquid under the conditions of polymerization and relatively inert. Such as hexane or isobutene.

A slurry process or a bulk process (e.g., a process without a diluent) may be carried out continuously in one or more loop reactors. The catalyst, as a slurry or as a dry free flowing powder, can be injected regularly to the reactor loop, which can itself be filled with circulating slurry of growing polymer particles in a diluent. Hydrogen, optionally, may be added as a molecular weight control. The reactor may be maintained at a pressure of from about 27 bar to about 45 bar and a temperature of from about 38° C. to about 121° C., for example. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence form removal of the diluent and all unreacted monomer and comonomers. The resulting hydrocarbon free powder can then be compounded for use in various applications. Alternatively, other types of slurry polymerization processes can be used, such stirred reactors is series, parallel or combinations thereof.

Polymer Product

The polymers produced by the processes described herein can be used in a wide variety of products and end-use applications. The polymers may include polypropylene and polypropylene copolymers.

In certain embodiments, propylene based polymers can be produced using the processes described herein. These polymers include atactic polypropylene, isotactic polypropylene, hemi-isotactic and syndiotactic polypropylene. Other propylene polymers include propylene block or impact copolymers.

Such propylene polymers may have a molecular weight distribution, i.e., a weight average molecular weight to number average molecular weight (Mw/Mn), of from about 2 to about 20, or from about 2 to about 12, for example, measured by gel permeation chromatography.

In addition, the propylene polymers may have a melt flow rate (MFR) measured by ASTM-D-1238-Condition L of from about 0.5 g/10 min to about 20.0 g/10 min or from about 1.0 g/10 min to about 17.0 g/10 min, or from about 1.5 g/10 min to about 14.0 g/10 min or from about 1.8 g/10 min to about 10.0 g/10 min, for example.

The propylene polymers may further have a melting point of at least about 115° C., or from about 119° C. to about 170° C., or from about 134° C. to about 165° C. or from about 140° C. to about 155° C. for example, measured by DSC.

The propylene polymer may have a density, measured by ASTM D1505, of from about 0.900 g/cc, or from about 0.905 g/cc.

Product Application

The polymers produced are useful in a variety of end-use applications, such as film production.

In one embodiment, the polymer is used to form a blown film. The blown film may be produced using any method known to those of ordinary skill in the art, such as a Davis Standard 5-layer mini coextrusion blown film line.

Further, the process may include coextruding additional layers to form a multilayer film. The additional layers may be any coextrudable film known in the art, such as syndiotactic polypropylene, low density polyethylene, linear low density polyethylene, medium density polyethylene, high density polyethylene, ethylene-propylene copolymers, butylene-propylene compolymers, ethylene-butylene copolymers, ethylene-propylene-butylene telpolymers, ethylene-vinyl acetate copolymers, ethylene-vinyl alcohol copolymers, nylons etc.

The coextruded film, or coextrudate, has at least an outer layer and a core layer. The outer layer may comprise the polypropylene, while the core layer may comprise a medium density polyethylene (density of from 0.927 to 0,947 g/cc, or typically 0.937 g/cc) or an impact copolymer. The core layer may comprise 15 wt % or less impact copolymer, or 10 wt % impact copolymer, or 5 wt % impact copolymer. The core layer comprising the impact copolymer may be blended with polyethylene or another polypropylene in any amount less than 15 wt % of impact copolymer based on the total amount of polymer in the core. The polypropylene may be a metallocene catalyzed polymer or a Ziegler-Natta catalyzed polymer.

In order to modify or enhance certain properties of the films for specific end-uses, it is possible for one or more of the layers to contain appropriate additives in effective amounts. The additives may be employed either in the application phase (formation of blown film) or may be combined with the polymer during the processing phase (pellet extrusion), for example. Such additives may include stabilizers (e.g., hindered amines, benzofuranon, indolinone) to protect against UV degradation, thermal or oxidative degradation and/or actinic degradation, antistatic agents (e.g., medium to high molecular weight polyhydric alcohols and tertiary amines), anti-blocks, coefficient of friction modifiers, processing aids, colorants, clarifiers, nucleators, and other additives known to those skilled in the art. Clarifiers, such as Milliken Milliad 3988, may be added in the range of from 0.15 wt % to 0.3 wt %.

In one embodiment, the polymer based films are blown for use in, for example, overwraps for retail clothing, specialty bakery films, fresh cut produce pouches, vertical form fill and seal packaging for grains (such as rice and beans), heat resistant films, sealant webs, low abuse frozen food films, and as a small component in shrink films. Such films generally exhibit resistance to the transmission of moisture, air and deleterious flavors therethrough and further exhibit desirable mechanical properties, such as strength and clarity.

The film may have a haze, as determined using ASTM 1003, of from 1% to about 10%, or from 3% to about 9%, or from 5% to about 8%. The film may have a 45° gloss, as determined using ASTM D523, of from 50% to about 90%, or from 60% to about 85%, or from about 70% to about 83%.

The film may also have a 1% secant modulus (machine direction), as determined by ASTM D882, of from about 80 kpsi to about 200 kpsi, or from about 90 kpsi to about 150 kpsi, or from about 95 kpsi to about 135 kpsi, or from about 96 kpsi to about 120 kpsi. The film may also have a 1% secant modulus (transverse direction), as determined by ASTM D882, of from 80 kpsi to about 200 kpsi, or from about 90 kpsi to about 150 kpsi, or from about 95 kpsi to about 135 kpsi, or from about 100 kpsi to about 120 kpsi.

The film may also have a static coefficient of friction, determined by ASTM D1894, of from less than 1, or from about 0.40 to about 0.85, or from about 0.50 to about 0.60. The film may also have a dynamic coefficient of friction, determined by ASTM D1894, of from less than 1, or from about 0.35 to about 0.85, or from about 0.50 to about 0.70, or from about 0.52 to about 0.65.

The film may also have a water vapor transmission rate (WVTR), as determined by ASTM F1249, of from about 0.3 g/100 in$^2$/day to about 0.8 g/100 in$^2$/day, or from about 0.4 g/100 in$^2$/day to about 0.5 g/100 in$^2$/day. The film may also have an oxygen transmission rate (OTR), as determined by ASTM D3985, of from about 100 cc/100 in$^2$/day to about 300 cc/100 in$^2$/day, or from about 130 cc/100 in$^2$/day to about 200 cc/100 in$^2$/day, or from about 150 cc/100 in$^2$/day to about 180 cc/100 in$^2$/day.

The film may also have low gels resulting in further clarity. The film may also have blocking forces of from about 5 to about 30, or from about 10 to about 25, or from about 20 to about 24. The film may also have a seal initiation temperature of from about 104° C. to about 150° C., or from about 115° C. to about 140° C., or from about 120° C. to about 135° C.

The film may also have improved hot tack. Hot tack is the strength of a hot seal measured at a specified time interval after completion of the sealing cycle but prior to the seal reaching ambient temperature. A seal temperature that is too cold results in a weak seal, as does a seal temperature that is too hot. Hot tack curves should ideally be bell-shaped, indicating the maximum hot seal strength possible and the processing window for obtaining acceptably high seal strength values.

The film may have an Elmendorf Tear, as determined by ASTM D-1922, in the machine direction of from about 15 grams to about 100 grams, or from about 25 grams to about 75 grams, or from about 40 grams to about 55 grams, and in the transverse direction of from about 75 grams to about 600 grams, or from about 125 grams to about 300 grams, or from about 150 grams to about 180 grams.

The film may have a dart impact, as determined by ASTM D-1709, of from about 30 grams, to about 90 grams, or from about 40 grams to about 75 grams, or from about 50 grams to about 70 grams.

EXAMPLES

Table 1 presents the polypropylene resins used as the skin layers of the coextruded film structures produced. Resin 1 and Resin 2 are clarified Ziegler-Natta and metallocene homopolymers, respectively. Resin 3 is a metallocene homopolymer, Resin 4 is a clarified metallocene random copolymer, and Resin 5, 6, and 7 are metallocene random copolymers.

TABLE 1

PP resins used as skin layer material.

| RESIN | MFR | Melting Point |
|---|---|---|
| RESIN 1 | 1.8 | 165° C. |
| RESIN 2 | 2.2 | 152° C. |
| RESIN 3 | 14.0 | 150° C. |
| RESIN 4 | 14.0 | 142° C. |
| RESIN 5 | 14.0 | 140° C. |
| RESIN 6 | 8.0 | 134° C. |
| RESIN 7 | 12.0 | 119° C. |

Tenite 1830F, available from Eastman Voridian, a 1.7 melt index, 0.92 g/cc low density polyethylene (LDPE) and Total Petrochemicals M3410 EP, a 0.9 melt index, 0.934 g/cc metallocene medium density polyethylene (mMDPE) were used as core layer resins. Total Petrochemicals 4170 polypropylene blown film grade, which is a heterophasic impact copolymer (ICP), was used as a minor component in the core layer in one of the film structures.

The film structures were produced on a Davis Standard 5-layer coextrusion blown film line. The extruders were grooved feed with 1 inch in diameter screw and 24 L/D. The line was characterized by having a conic spiral mandrel with a 60 mm diameter die, and a 1.2 mm die gap. The temperature of the air for the cooling ring was 35° C. The films produced were 1.2 mils in thickness, 2.5 BUR, with A/B/A type structure having a layer distribution of 25%/50%/25%. Table 2 presents the coextruded film structures that were produced with the materials previously described.

TABLE 2

Coextruded A/B/A films.

| FILM ID | SKIN LAYER RESIN | CORE LAYER RESIN |
|---|---|---|
| CONTROL A | LDPE | LDPE |
| CONTROL B | RESIN 1 | mMDPE |
| C | RESIN 2 | LDPE |
| D | RESIN 2 | LDPE + 15% ICP |
| E | RESIN 2 | mMDPE |
| F | RESIN 3 | mMDPE |
| G | RESIN 4 | mMDPE |
| H | RESIN 5 | mMDPE |
| I | RESIN 6 | mMDPE |
| J | RESIN 7 | mMDPE |

FIG. 1 presents the gloss and haze values obtained for the blown film samples A to E presented in Table 2. Film sample C produced equivalent optical properties as compared to control A (LDPE) and significantly better optical properties as compared to control B. Used as skin layer, Resin 2 produced a film with only 3% haze and 83% gloss 45°. Adding 15% ICP to the core (sample D) had negligible effect in the optical properties. Sample E produced significantly better optical properties as compared to control B. Table 3 provides the numerical values represented in FIG. 1.

TABLE 3

Gloss and Haze Values of Blown Structures

|  | A (control) | B (control) | C | D | E |
|---|---|---|---|---|---|
| Gloss 45° % | 87 | 58 | 83 | 82 | 76 |
| Haze % | 3 | 9 | 3 | 3 | 5 |

Figure 2:
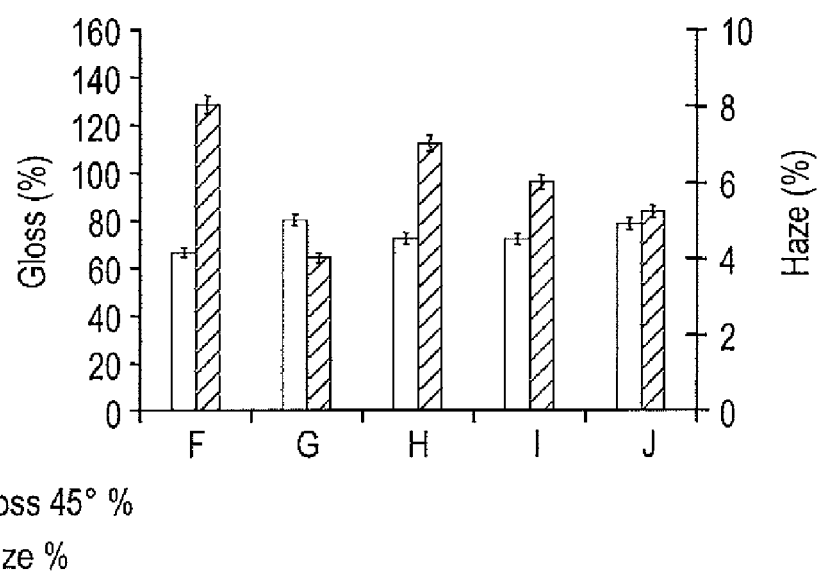
FIG. 2 illustrates the gloss and haze values of blown structures made from metallocene catalyzed polymers.

FIG. 2 presents the gloss and haze values obtained for the blown film samples F to J in Table 2. FIG. 2 also presents the melting point of the skin layer material used to produce the film samples, Film sample J, which was produced using a random copolymer with the lowest melting point, produced better optical properties as compared to samples F, H, and I made using higher melting point materials. Film sample G produced with clarified resin 4 produced the best optical properties. Table 4 provides the numerical values represented in FIG. 2.

TABLE 4

Gloss and Haze Values of Blown Structures

|  | F | G | H | I | J |
|---|---|---|---|---|---|
| Gloss 45° % | 66 | 80 | 72 | 72 | 78 |
| Haze % | 8 | 4 | 7 | 6 | 5 |

Figure 3:
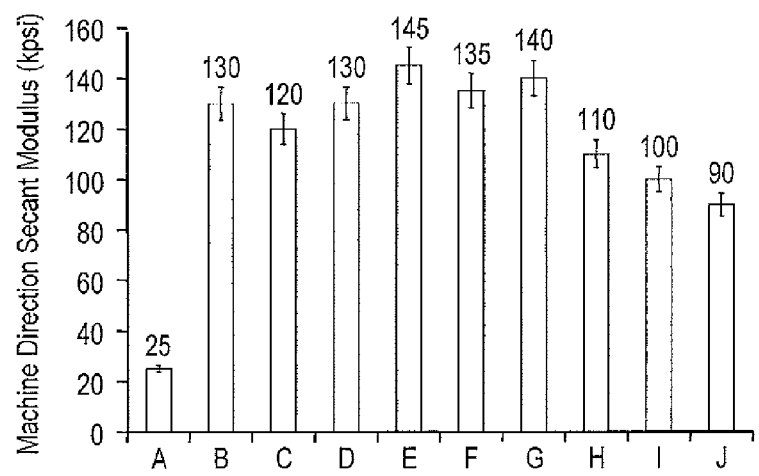
FIG. 3 illustrates the secant modulus and haze/modulus ratio of the films.

FIG. 3 presents the machine direction secant modulus (stiffness) of all of the blown film samples. Sample C has five times higher secant modulus as compared to control A (LDPE) while its optical properties (FIG. 1) are equivalent. Adding 15% 4170 ICP in the core layer (sample D) slightly increased the secant modulus as compared to sample C. The samples produced with random copolymer resins have lower secant modulus. Film sample J, which was produced using a random copolymer with the lowest melting point, produced the lowest modulus as compared to samples F, H, and I made using higher melting point materials. Film sample F and G produced with clarified resins produced the highest modulus. Table 5 provides the numerical values represented in FIG. 3. Table 6 provides the Secant Modulus (kpsi) in the transverse direction (TD) and the dynamic coefficient of friction for each sample.

TABLE 5

Secant Modulus (MD) of Blown Structures

|  | A | B | C | D | E | F | G | H | I | J |
|---|---|---|---|---|---|---|---|---|---|---|
| Secant Modulus (kpsi) (MD) | 25 | 130 | 120 | 130 | 145 | 135 | 140 | 110 | 100 | 90 |

TABLE 6

| Secant Modulus (TD) and Dynamic Coefficient of Friction (COF) of Blown Structures | | | | | | | | | |
|---|---|---|---|---|---|---|---|---|---|
| | A | B | C | D | E | F | G | H | I | J |
| Secant Modulus (kpsi) (TD) | 24 | 136 | 120 | 124 | 134 | 130 | 133 | 112 | 100 | 100 |
| Dynamic COF | >1 | 0.36 | 0.52 | 0.52 | 0.52 | 0.58 | 0.55 | 0.62 | 0.65 | 0.54 |

Figure 4:
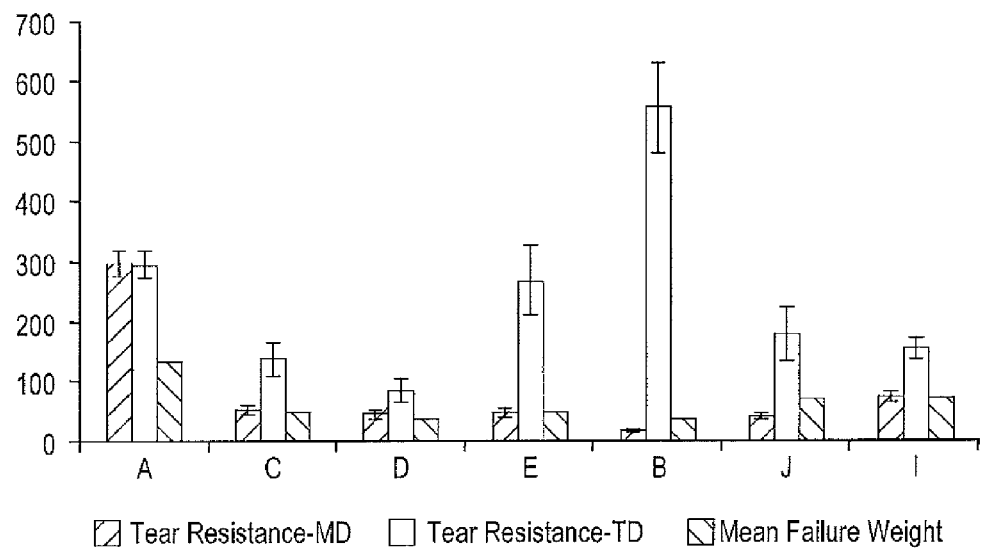
FIG. 4 illustrates the tear and dart impact resistance.

FIG. 4 presents the machine direction and transverse direction Elmendorf Tear and the dart impact resistance of some of the blown film samples. Table 7 provides the values of such data. Table 8 provides the average blocking force values. The polypropylene resin skin had a low tendency to block and relatively low dynamic coefficient of friction values (as shown in Table 6 above) as compared to LDPE. The random copolymer blocked the least but had higher dynamic coefficient of friction values as compared to the polypropylene homopolymer.

TABLE 7

| Tear and Dart Impact Resistance | | | | | | | |
|---|---|---|---|---|---|---|---|
| | A | B | C | D | E | I | J |
| Tear Resistance (g) (MD) | 298.2 | 18.5 | 52.9 | 45.5 | 48.0 | 74.0 | 41.5 |
| Tear Resistance (g) (TD) | 295.7 | 558.4 | 138.4 | 85.6 | 269.3 | 157.1 | 179.7 |
| Mean Weight Failure (g) | 133.0 | 40.0 | 50.0 | 37.5 | 49.8 | 73.0 | 70.8 |

TABLE 8

| Blocking Force | | | | | |
|---|---|---|---|---|---|
| | A | B | E | I | J |
| Average Blocking Force | 85.2 | 21.6 | 24.0 | 6.6 | 6.6 |

While the foregoing is directed to embodiments of the present invention, other and further embodiments of the invention may be devised without departing from the basic scope thereof and the scope thereof is determined by the claims that follow.

What is claimed is:

1. A process of forming a blown film comprising:
    providing a Ziegler-Natta catalyzed polypropylene having a melt flow rate of from 1.8 to 14.0 g/10 min. as measured by ASTM D1238 condition L and a melting point of at least 115° C.; and
    forming the polypropylene into a layer of a blown film, wherein the layer consists of the polypropylene; and
    quenching said blown film with air at a temperature of less than 10° C., wherein said blown film has a haze of less than 10% as measured in accordance with ASTM 1003 and a 45° gloss of greater than 70% as measured in accordance with ASTM D523, and wherein said process further comprises internal bubble cooling, stabilizing the external bubble with stabilizers, and the process utilizes a dual lip air ring, and wherein the blown film exhibits a 1% secant modulus (machine direction) measured in accordance with ASTM D882 in the range of 80 to 135 kpsi when the blown film has a thickness of 1.2 mil.

2. The process of claim 1, wherein said blown film further comprises a clarifier.

3. The process of claim 2, wherein said clarifier is present in an amount of from 0.15 to 0.3 wt %.

4. The process of claim 1, wherein the blown film exhibits a static coefficient of friction measured in accordance with ASTM D1894 of less than 1.0.

5. The process of claim 1, wherein the blown film exhibits a WVTR measured in accordance with ASTM F1249 of 0.3 to 0.8 g/100 in²/day.

6. The process of claim 1, wherein the blown film exhibits an OTR measured in accordance with ASTM D3985 of 100 to 300 cc/100 in²/day.

7. The process of claim 1, wherein the blown film exhibits low gels.

8. The process of claim 1, wherein said film is co-extruded to form a co-extrudate, and wherein said co-extrudate comprises an outer layer and a core layer.

9. The process of claim 8, wherein said outer layer comprises said polypropylene.

10. The process of claim 8, wherein said core layer comprises a medium density polyethylene.

11. The process of claim 8, wherein said core layer comprises an impact copolymer.

12. The process of claim 11, wherein said core layer comprises 15 wt % or less of impact copolymer.

* * * * *